June 24, 1941. H. A. HICKS 2,246,848
MOTOR VEHICLE
Filed Oct. 3, 1938 2 Sheets-Sheet 1

INVENTOR
Harold A. Hicks.
BY
Harness, Dick, Palee & Harris
ATTORNEYS.

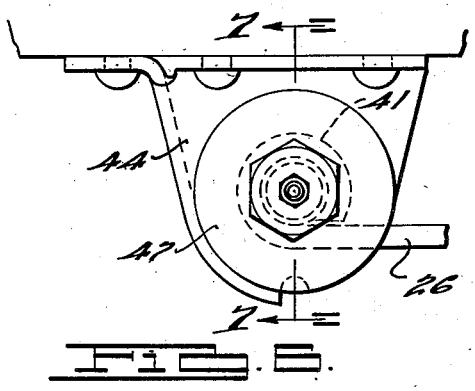
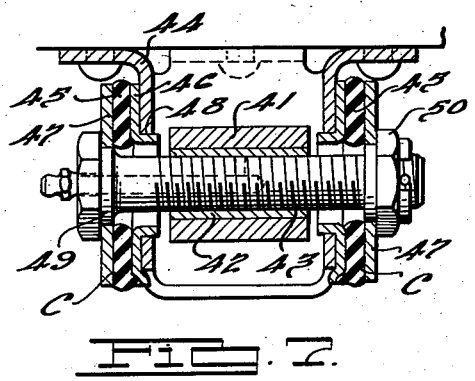
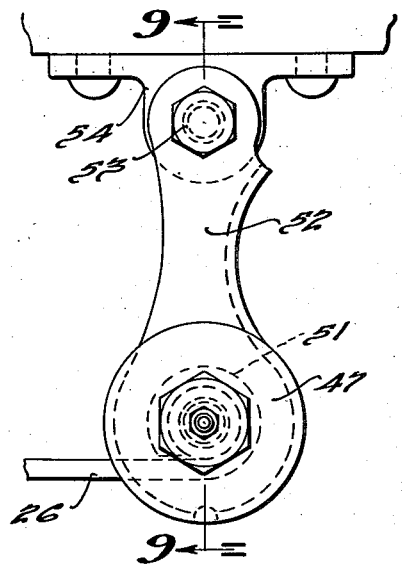
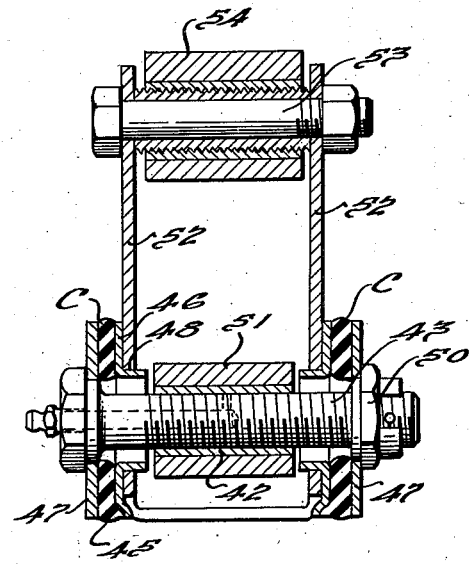

Patented June 24, 1941

UNITED STATES PATENT OFFICE 2,246,848

MOTOR VEHICLE

Harold A. Hicks, Detroit, Mich., assignor to Chrysler Corporation, Highland Park, Mich., a corporation of Delaware Application October 3, 1938, Serial No. 232,933

5 Claims. (Cl. 296—28)

This invention relates to motor vehicles and refers more particularly to improvements in vehicle body structures and mountings therefor.

Efforts in the past have been directed toward providing a body structure affording a maximum amount of rigidity for its weight. Inasmuch as a body structure must be used in the vehicle it is logical to so construct the body that it will absorb the loads rather than to rely for the most part on a chassis structure on which a body is separately mounted. When the body is constructed to function as the entire vehicle frame then difficulty has been experienced in that road shocks give rise to objectionable harshness through the body. This harshness is particularly accentuated when the body structure is mounted on conventional types of independently sprung ground wheels wherein obstructions striking the wheels cause shocks to be transmitted to the body resulting in harshness.

Harshness may be defined as a vibration less in frequency than sound and of greater frequency than a shake. Vibrations producing harshness in a body are particularly annoying and irritating to the occupants of the vehicle.

In view of the tendency of very rigid vehicle body structures to give rise to harshness, this type of body has been generally considered as impracticable commercially although theoretically highly desirable from all other viewpoints.

I have discovered a system of body structure and mounting which permits the use of the desirable rigid body structure without separate chassis and at the same time eliminating harshness without sacrificing rigidity in the body.

I therefore preferably employ a chassisless body of maximum rigidity obtained by truss-like side body structures sloping at their front and rear ends approximately at the front and rear ends of the vehicle. Then in order to prevent harshness in the body I employ rubber connections at the front and rear wheel mountings with the body structure thereby dampening objectionable vibrations at their source. I preferably employ rubber working in shear as such arrangement most effectively dampens such vibrations.

The resulting arrangement affords maximum rigidity in the body structure while providing a most pronounced absence of harshness. Rubber shear suspension systems have heretofore been proposed but, so far as I am aware, nobody has heretofore preceived the advantages to be derived by employing as an organization a strutted trusslike and chassisless body structure in conjunction with rubber working in shear at the wheel connections with the body. Such arrangement results in the realization of the maximum advantages of the rigid body structure as well as the shear rubber wheel suspension mountings.

Further objects and advantages of my invention will be more apparent as this specification progresses, reference being made to the accompanying drawings in which:

Fig. 6 is a detail side elevational view of the front end of a rear spring mounting.

Fig. 7 is a sectional view taken as indicated by line 7—7 of Fig. 6.

Fig. 8 is a detail side elevational view of the rear end of a rear spring mounting.

Fig. 9 is a sectional view taken as indicated by line 9—9 of Fig. 8.

Figure 1:
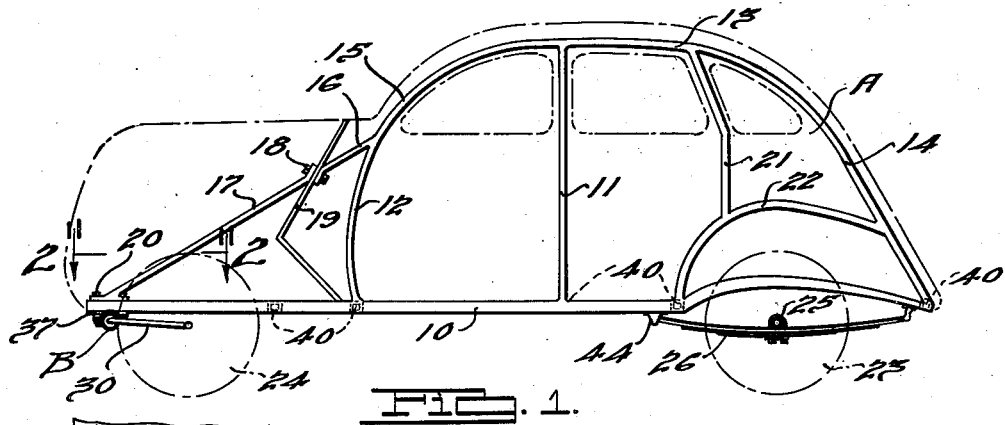
Fig. 1 is a diagrammatic side elevational view of the body framework.

Referring to the drawings, I have illustrated a motor vehicle A somewhat diagrammatically comprising a rigid framework which may be fabricated in any suitable manner. This framework comprises side structures each of truss-like form braced transversely of the vehicle by the usual roof, dash, and bottom cross bracing as will be readily understood.

Each side truss structure comprises a lower structural tension chord 10 either of unitary form or of elements welded or otherwise rigidly connected, the chord 10 extending approximately the length of the vehicle. Rising from chord 10 is the door post brace 11 and the front post 12. The compression structural member 13 of the truss extends along the top of the body and is arched by front and rear structural extensions so as to efficiently receive the load at the end portions of chord 10. Thus, at the rear end the compression member 13 slopes downwardly and rearwardly at 14 for connection to the rear of chord 10. At the front portion, member 13 slopes forwardly and downwardly at 15 to form the windshield post portion of the post 12 and then branches to provide the strut 16 which may have a structural extension 17 joined thereto at 18 with the transverse dash 19 disposed therebetween. The lower end of strut extension 17 is secured at 20 to chord 10 preferably adjacent the front end of the latter.

The illustrated side truss is additionally braced vertically by post 21 which connects member 13 with the auxiliary chord member 22 adjacent the rear wheel 23. The various structural members throughout the body A may be hollow tubes, solid, or otherwise fashioned to carry the stresses and provide a rigid body structure.

In my drawings I have shown the front steering wheels, one of which is illustrated at 24, of the independently sprung type and the rear wheels 23 carried by an axle 25 mounting the rear of the body of the leaf springs 26 although in the broader aspects of my invention the front and rear wheels may have the same type of springing.

Each front wheel 24 is carried by a spindle 27 steerable around king pin 28 by the usual steering arm 29. The king pin 28 connects spindle 27 with the oscillating support arm 30 which is supported by the body structure to accommodate rising and falling of the spindle 27 and its wheel independently of the other similar front wheel assembly.

The arm 30 has a crank portion 31 to which is secured a cylindrical rubber composition mass 32 anchored at its outer surface to the body. One method of accomplishing the desired assembly is to vulcanize the rubber 32 to crank 31 and also to an outer sleeve 33 held by lug 34 to the cylindrical cap portion 35 of the bracket 36. Transverse member 37 connects the front ends of the side chords 10 and is recessed at 38 to receive the bracket 36. Fasteners 39 assemble the cap 35 and bracket 36 to cross member 38 and thereby support the rubber unit B in place.

Figure 2:
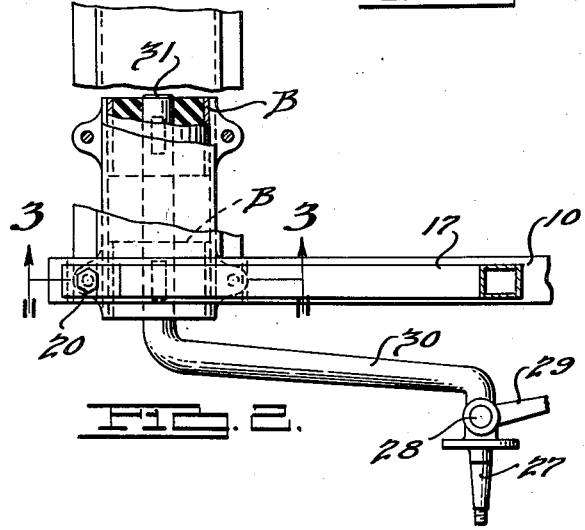
Fig. 2 is a detail sectional plan view taken as indicated by line 2—2 of Fig. 1 and showing a front wheel suspension.
Figure 3:
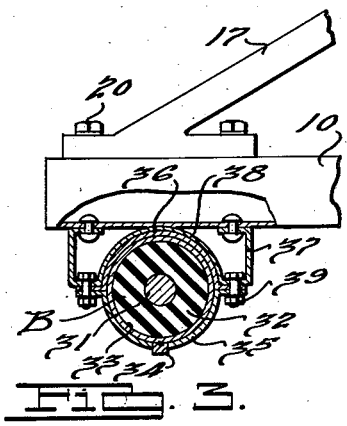
Fig. 3 is a detail sectional elevational view taken as indicated by line 3—3 of Fig. 2.

The rubber unit comprising parts 31, 32 and 33 forms a torsional rubber spring for wheel 24 insulating the body from the wheel against shock transmission. As the wheel 24 rises and falls the rubber 32 is placed in torsional shear by its yielding action, the rubber supporting the body load in this manner. For stability I have employed two rubber units for each support arm 30 as best seen in Fig. 2.

For most direct load transmission from the torsional units B to the body A, the struts 17 terminate downwardly at the points where the units B load the respective chords 10. Additional transverse braces between chords 10 are indicated at 40.

At the rear, the front end of each spring 26 has the main leaf thereof formed with eye 41 carrying bushing 42 threadedly engaging shackle pin 43. This pin is connected, through rubber pads or wafers acting in shear, with the bracket 44 fixed to chord 10 adjacent the juncture of post 21 and member 22 with the chord so that the load at bracket 44 is distributed efficiently to the body truss. Thus at each end of pin 43 there is an assembly C comprising a shear rubber pad 45 vulcanized to plates 46, 47 respectively secured as by pressed fit with the openings 48 of bracket 44 and the pin shoulders 49. A nut 50 assists in holding the assemblies C in position and places compression on the rubber pads 45. If desired the rubber 32 of units B may also be maintained under radial compression.

The rear end of each spring 26 has the main leaf formed with eye 51 journalled on a similar shackle pin 43 which as in Fig. 7 is supported by the assemblies C only now these assemblies are mounted in swinging shackle links 52 which swing through a pivot pin 53 supported by the bracket 54 adjacent the rear end of chord 10.

Figure 4:
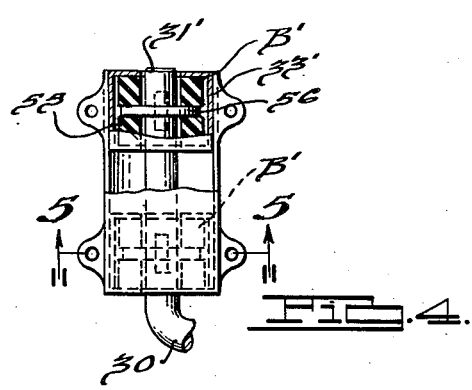
Fig. 4 is a view corresponding to Fig. 2 but showing a modified arrangement of mounting.
Figure 5:
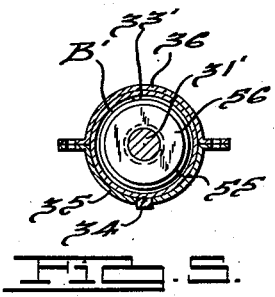
Fig. 5 is a detail sectional elevational view taken as indicated by line 5—5 of Fig. 4.

In the Fig. 4 modification, the crank portion 31' is mounted by rubber units B' each comprising rubber rings 55 vulcanized to the outer shell 33' at the outer ends of rings 55 and at the inner ends these rings are vulcanized to an annular shoulder 56 carried by crank 31'. Here again the rubber 55 is in torsional shear as the wheel rises and falls. In Fig. 4 shocks from the wheel acting to shift crank 31' transversely to its axis of oscillation are somewhat more effectively dampened by the shear action of rubber rings 55 than for corresponding shocks at crank 31 in Fig. 1.

Ordinarily road obstructions and irregularities cause wheels 24 to set up harshness in the body A but with my invention the body A may be made of most efficient rigidity without giving rise to harshness. Thus the wheels 24 are entirely insulated by rubber at units B or B' from the body and likewise the rear wheels are insulated by assemblies C. The rubber action in shear dissipates the shocks and stresses and frees the body structure from harshness during normal running of the vehicle.

Relative movement laterally between the body and wheels is effectively resisted and dampened by the rubber suspensions in the front and rear wheels. At the rear the rubber pads 45 of the units C compressively resist lateral movement, as when the vehicle is rounding a curve. At the front wheel suspension the rubber 32 of units B is placed in shear axially of the cranks 31 while in Fig. 4 the rubber rings 55 are placed in compression.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. A chassisless motor vehicle comprising, in combination, a rigid truss-like body structure extending approximately the length of the vehicle, front and rear ground wheels, and articulating support means including members adapted for vertical yielding but substantially incapable of horizontal yielding for operably connecting certain of said wheels with said body structure, each of said support means including a body of rubber subjected to shear when the connected wheel strikes an obstruction in the roadway whereby horizontal shocks are absorbed, said body structure including an upright truss brace at each side of the vehicle intermediate the length thereof and a strut inclined forwardly and downwardly from each of said upright braces for connection adjacent the rubber body of one of said front wheel support means.

2. A chassisless motor vehicle comprising, in combination, a rigid truss-like body structure extending approximately the length of the vehicle, front and rear ground wheels, and articulating support means operably connecting each of said wheels with said body structure, each of said front wheel support means accommodating rising and falling wheel movements independently of the remaining wheels and including a body of rubber subjected to shear when the connected wheel strikes an obstruction in the roadway.

3. A chassisless motor vehicle comprising, in combination, a rigid truss-like body structure extending approximately the length of the vehicle, front and rear ground wheels, and articulating support means operably connecting each of said wheels with said body structure, each of said front wheel support means accommodating rising and falling wheel movements independently of the remaining wheels and including a body of rubber subjected to shear when the connected wheel strikes an obstruction in the roadway, each of said rear wheel support means including a body of rubber subjected to shear when the connected wheel strikes an obstruction in the roadway.

4. A chassisless motor vehicle comprising, in combination, a rigid truss-like body structure extending approximately the length of the vehicle, front and rear ground wheels, and articulating support means operably connecting each of said wheels with said body structure, each of said front wheel support means accommodating rising and falling wheel movements independently of the remaining wheels and including a body of rubber subjected to shear when the connected wheel strikes an obstruction in the roadway, each of said rear wheel support means including a longitudinally extending leaf spring and a body of rubber between each end of the spring and the body subjected to shear when the connected wheel strikes an obstruction in the roadway.

5. A chassisless motor vehicle comprising, in combination, a rigid truss-like body structure extending approximately the length of the vehicle, front and rear ground wheels, support means operably connecting each of said front wheels with said body structure comprising articulating members adapted for vertical yielding movement when the connected wheel strikes an obstruction in the roadway, said members being substantially incapable of yielding horizontally, and means including rubber operably disposed between said members and said body structure; said rubber being subjected to shear when said wheel strikes said obstruction whereby horizontal shocks are absorbed.

HAROLD A. HICKS.